(12) United States Patent
Rosenfeld et al.

(10) Patent No.: US 8,416,715 B2
(45) Date of Patent: Apr. 9, 2013

(54) INTEREST DETERMINATION FOR AUDITORY ENHANCEMENT

(75) Inventors: Daniel A. Rosenfeld, Seattle, WA (US); Zicheng Liu, Bellevue, WA (US); Ross G. Cutler, Redmond, WA (US); Philip A. Chou, Bellevue, WA (US); Christian Huitema, Clyde Hill, WA (US); Kori Quinn, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 767 days.

(21) Appl. No.: 12/484,906

(22) Filed: Jun. 15, 2009

(65) Prior Publication Data
US 2010/0315482 A1    Dec. 16, 2010

(51) Int. Cl.
*H04L 12/16* (2006.01)

(52) U.S. Cl.
USPC ............... 370/267; 348/14.03; 348/14.08; 348/14.11; 348/14.16; 370/265; 379/202.01; 709/203; 709/228

(58) Field of Classification Search .... 348/14.01–14.16; 370/259–271, 351–356; 709/201–207, 217–248; 379/202.01–207.01
See application file for complete search history.

(56) References Cited

U.S. PATENT DOCUMENTS

| | | | |
|---|---|---|---|
| 6,483,532 B1 | | 11/2002 | Girod |
| 6,608,644 B1 * | | 8/2003 | Kondo et al. ............... 348/14.09 |
| 6,806,898 B1 * | | 10/2004 | Toyama et al. ............ 348/14.16 |
| 7,027,655 B2 * | | 4/2006 | Keeney et al. ................ 382/239 |
| 7,176,957 B2 * | | 2/2007 | Ivashin et al. .............. 348/14.09 |
| 7,331,929 B2 | | 2/2008 | Morita et al. |
| 7,532,230 B2 * | | 5/2009 | Culbertson et al. ........ 348/14.08 |
| 7,715,541 B2 * | | 5/2010 | Arrant et al. ............. 379/202.01 |
| 7,865,834 B1 * | | 1/2011 | van Os et al. ................. 715/756 |
| 2003/0197779 A1 * | | 10/2003 | Zhang et al. .............. 348/14.16 |
| 2003/0218672 A1 * | | 11/2003 | Zhang et al. .............. 348/14.16 |
| 2004/0216049 A1 | | 10/2004 | Lewis |
| 2006/0140420 A1 * | | 6/2006 | Machida ...................... 381/116 |
| 2006/0238877 A1 | | 10/2006 | Ashkenazi |
| 2006/0244817 A1 * | | 11/2006 | Harville et al. ............ 348/14.08 |
| 2006/0265651 A1 * | | 11/2006 | Buck ............................. 715/700 |
| 2007/0038701 A1 * | | 2/2007 | Majors et al. ................ 709/204 |
| 2007/0162922 A1 * | | 7/2007 | Park ................................ 725/10 |
| 2008/0037803 A1 | | 2/2008 | Breed |
| 2008/0080846 A1 * | | 4/2008 | Grip ............................... 396/51 |
| 2008/0297586 A1 | | 12/2008 | Kutrz |
| 2008/0297589 A1 | | 12/2008 | Kutrz |

OTHER PUBLICATIONS

Stiefelhagen, et al. "Estimating Focus of Attention Based on Gaze and Sound" ICMI International Conference College State, PA, Oct. 14, 2004.

Gemmell, et al., "Implementing Gaze-Corrected Videoconferencing," IEEE Multimedia Oct.-Dec. 2000, pp. 26-35.

Sibert, et al., "The Reading Assistant: Eye Gaze Triggered Auditory Prompting for Reading Remediation," George Washington University 2000, 7 pages.

* cited by examiner

*Primary Examiner* — Hemant Patel
(74) *Attorney, Agent, or Firm* — Lee & Hayes, PLLC

(57) ABSTRACT

Gaze tracking or other interest indications are used during a video conference to determine one or more audio sources that are of interest to one or more participants to the video conference, such as by determining a conversation from among multiple conversations that a subset of participants are participating in or listening to, for enhancing the audio experience of one or more of the participants.

19 Claims, 14 Drawing Sheets

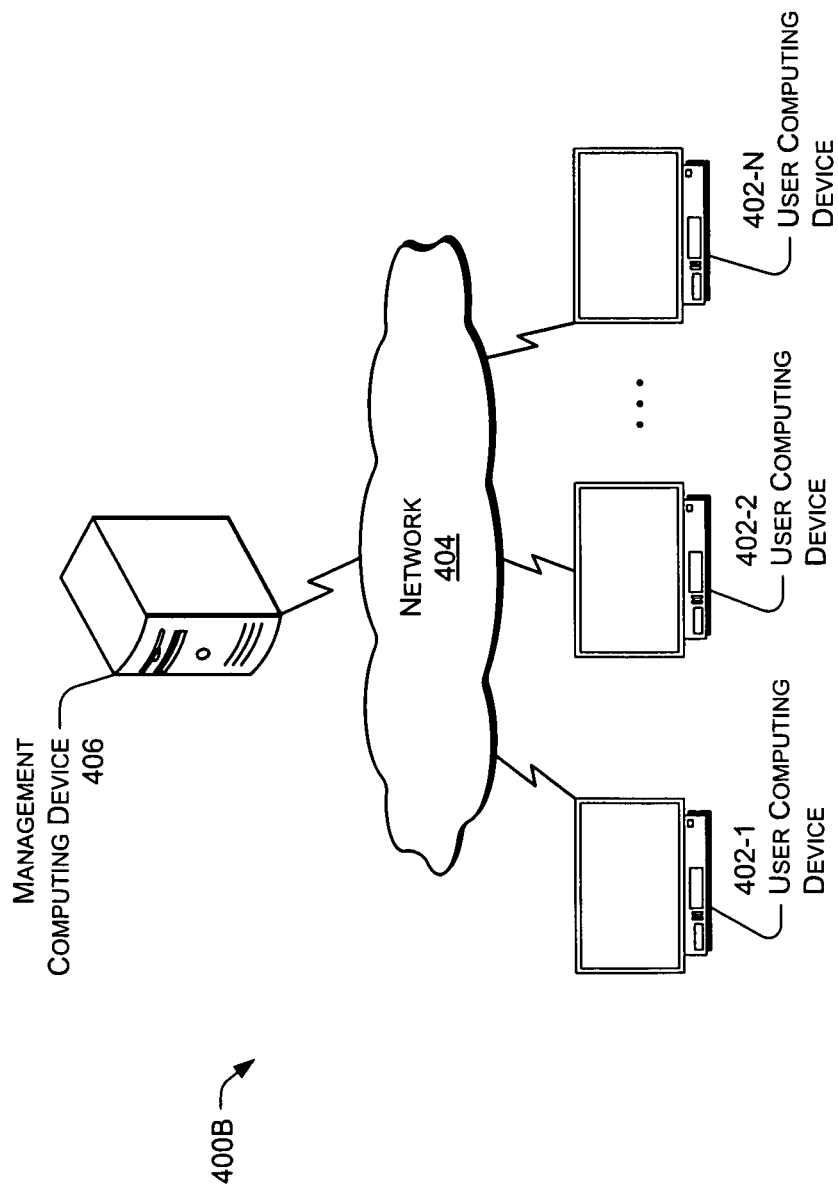

802 — 804 — 806 — 808 — ← 518, 618

| Participant ID | Current Focus | Time | Party of Interest |
|---|---|---|---|
| Alex | Bob | 3 | Carly |
| Bob | Carly | 32 | Carly |
| Carly | Bob | 36 | Bob |
| David | Edith | 20 | Edith |
| Edith | David | 18 | David |
| Fred | Off Screen | 30 | David |
| Listening Party | Carly | 25 | Carly |

INTEREST TRACKING TABLE

| Conversation Group ID | Participants |
|---|---|
| 1 | Alex  Bob  Carly  Listening Party |
| 2 | David  Edith  Fred |
|  |  |

CONVERSATION GROUPING TABLE

INTEREST DETERMINATION FOR AUDITORY ENHANCEMENT

BACKGROUND

In recent years, the use of video conferencing has become increasingly popular for enabling multiple parties located at multiple remote locations to communicate and collaborate with each other. For example, the wide availability of broadband Internet connectivity and inexpensive video capture and display equipment has made video conferencing technology easily accessible. Video conferencing systems can include both dedicated systems that have all required components packaged into a specialized apparatus, and personal computer (PC) based systems that include a general-purpose computer having a webcam, communication software, and a broadband Internet connection.

Dedicated video conferencing systems typically include a high-quality video camera connected to a console that contains all required electrical interfaces, a processor, and a software or hardware-based codec. One or more microphones are typically connected to the console, and a large flat-panel monitor with loudspeakers provides sound and display of video images of participating parties.

On the other hand, PC-based systems are typically created using add-ons to general-purpose PCs that enable the PCs to be used as video conferencing devices. A video camera (e.g., a web cam), a microphone and speakers are used with the PC, along with software or specialized hardware that provides the necessary codec and transmission interfaces. The PC-based systems usually result in lower quality video, but are typically less expensive than the dedicated systems, and often more flexible in their compatibility with other systems.

Simultaneous video conferencing among two or more remote devices can be carried out in a peer-to-peer manner, or through the use of a central management computing device, also referred to as a multipoint control unit, conferencing server, or the like. In the peer-to-peer technique, each participant's video conferencing device manages communication with the video conferencing devices of the other participants. In the central management technique, the management computing device serves as a bridge that interconnects video conference calls from multiple parties, similar to an audio conference call. For example, all the parties to the video conference connect to the management computing device, which then manages and controls delivery of the communications between the participating parties.

SUMMARY

This Summary is provided to introduce a selection of concepts in a simplified form that are further described below in the Detailed Description. This Summary is not intended to identify key or essential features of the claimed subject matter; nor is it to be used for determining or limiting the scope of the claimed subject matter.

Some implementations disclosed herein use gaze tracking or other interest indications to determine audio sources in a video conference that interest one or more participants for enhancing one or more participants' audio experience during the video conference.

BRIEF DESCRIPTION OF THE DRAWINGS

The detailed description is set forth with reference to the accompanying drawing figures. In the figures, the left-most digit(s) of a reference number identifies the figure in which the reference number first appears. The use of the same reference numbers in different figures indicates similar or identical items or features.

FIGS. 4A and 4B illustrate exemplary network architectures and systems according to some implementations.

FIG. 8A illustrates an exemplary interest tracking table according to some implementations herein.

FIG. 8B illustrates an exemplary conversation table according to some implementations herein.

DETAILED DESCRIPTION

Overview

Figure 1:
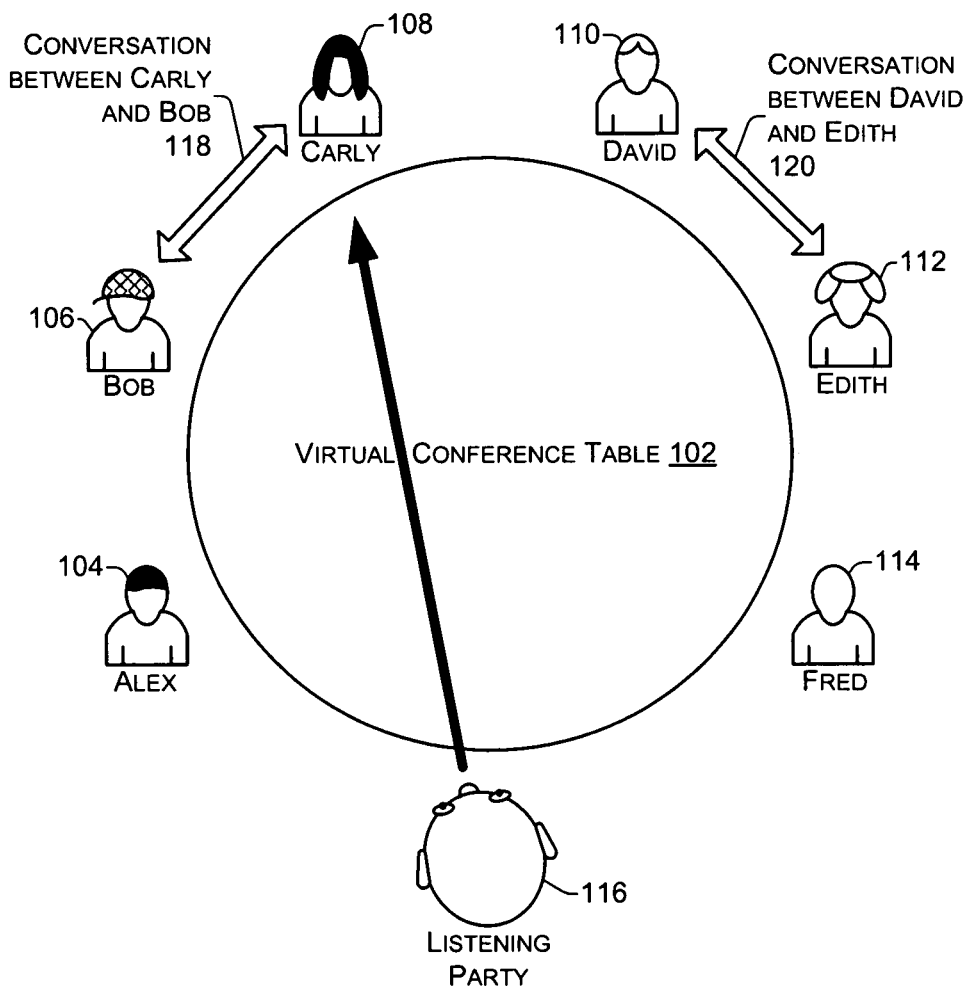
FIG. 1 illustrates an exemplary virtual video conference according to some implementations disclosed herein.

FIG. 1 illustrates an example of a virtual conference table 102 according to some implementations herein. In the example of FIG. 1, there are seven participants in a video conference, a first participant 104 (referred to hereafter as Alex 104), a second participant 106 (referred to hereafter as Bob 106), a third participant 108 (referred to hereafter as Carly 108), a fourth participant 110 (referred to hereafter as David 110), a fifth participant 112 (referred to hereafter as Edith 112), a sixth participant 114 (referred to hereafter as Fred 114), and a seventh participant 116 (referred to hereafter as the listening party).

During the video conference, as often occurs during a live conference, multiple parties might be speaking to other parties at the same time. For example, as illustrated in FIG. 1, participant Carly 108 might be carrying on a conversation 118 with participant Bob 106, while at the same time participant David 110 might be carrying on a conversation 120 with participant Edith 112. Suppose that the listening party 116 is interested in hearing what Carly 108 and Bob 106 are talking about, and not interested in hearing the conversation between David 110 and Edith 112. In an actual live conference, the listening party 116 would be able to turn his head and naturally focus on the conversation between Carly 108 and Bob 106. However, during a video conference, all the audio feeds from all parties are typically mixed at the same level, resulting in an inability to distinguish one conversation from the other.

Implementations disclosed herein, during a video conference, automatically identify a particular participant that a listening party is interested in listening to for augmenting or otherwise enhancing the audio from the particular participant during the video conference. For example, when multiple parties are speaking during the video conference, a particular participant that the listening party is interested in hearing is identified from gathered interest information, and the audio feed for that particular party is then augmented to the listening party. In some implementations, a gaze tracking system is provided that tracks the listening party's focal point to determine which participant the listening party is interested in, and increases the audio gain for that particular participant, or decreases the audio gain from other participants who are currently speaking. Further, interest information gathered from the other participants can also be used to determine one or more additional parties that are interested in the same conversation as the listening party. The interest information is used to create a conversation grouping of participants that are participating in or listening to the same conversation, so that audio between multiple parties in the same conversation grouping can be automatically enhanced, while audio to and from participants of the video conference that are in a different conversation group is not enhanced.

Exemplary Computing Device

Figure 2:
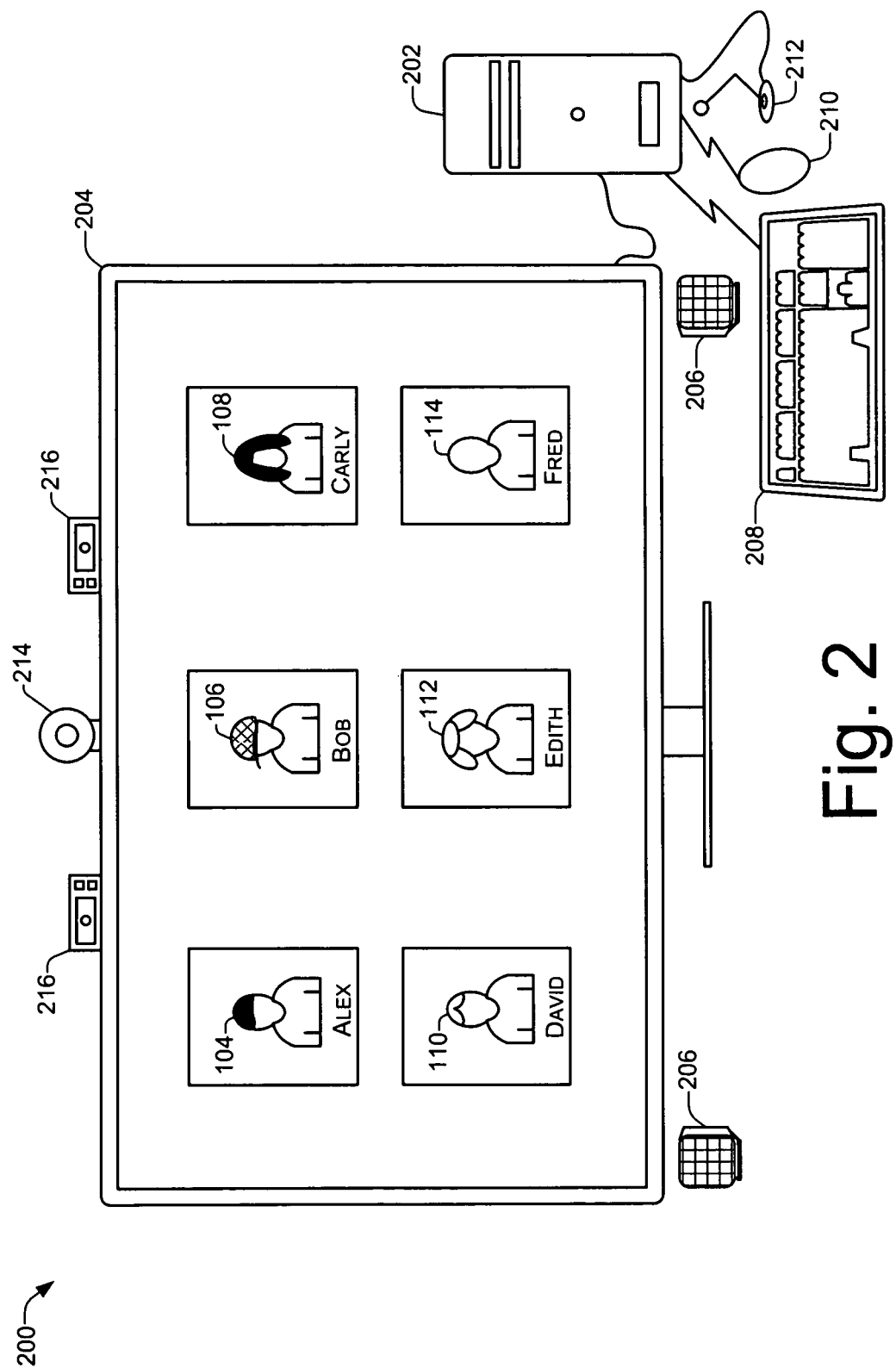
FIG. 2 illustrates an exemplary user computing device according to some implementations.

FIG. 2 illustrates an exemplary computing device 200 which can be used to implement the techniques described herein, and which may be representative, in whole or in part, of elements described herein. The computing device 200 is only one example of a video conferencing computing device that can be used with implementations disclosed herein, and is not intended to suggest any limitation as to the scope of use or functionality of the implementations herein. Neither should the computing device 200 be interpreted as having any dependency or requirement relating to any one or combination of components illustrated in the example of FIG. 2.

Computing device 200 can be a general-purpose computing-based device including a computer 202. In some implementations, computing device 200 can be, for example, a desktop computer, a handheld computer, a notebook or laptop computer, a server computer, a game console, a smart phone, a cell phone, a palmtop computer, or the like. In other implementations, computing device 200 can be a dedicated video conferencing system. The functional components of computing device 200 can include, but are not limited to, one or more processors and memory (not shown in FIG. 2).

A display 204, such as a monitor, flat panel display, or other type of display device is connected to computer 202 for displaying output from computer 202 such as video and graphics. In addition, other output peripheral devices include two or more speakers 206 for providing stereo sound, surround sound, spatial audio, or the like. Thus, during a video conference, video images of the other participants 104-114 of the video conference can be displayed on display 204, and audio of the voices of the participants is heard through speakers 206.

Computing device 200 also includes a number of input devices to enable a user to enter commands and information into computing device 200 via input devices such as a keyboard 208 and a pointing device 210 (e.g., a "mouse"). Furthermore, a microphone 212 may be provided to enable the user to communicate with other participants to the video conference, and a webcam 214 or other type of camera can be mounted in a position to take images of the user of computing device 200, such as during a video conference, to provide a video feed of the user to the other participants of the video conference. Additionally, or alternatively to speakers 206 and microphone 212, a headset (not shown) having speakers and a microphone might be used with computing device 200 for improving the quality of audio communications.

Figure 3:
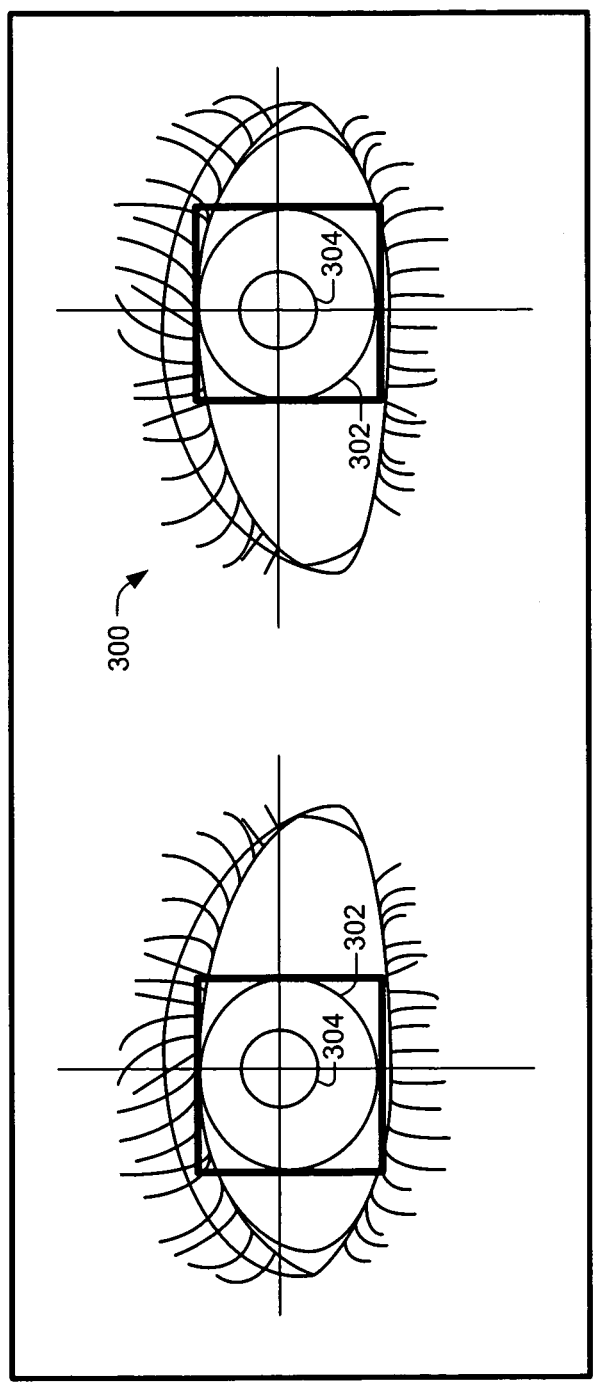
FIG. 3 illustrates an exemplary gaze tracking technique according some implementations.

In addition, implementations herein can include one or more nonintrusive eye tracking or gaze tracking sensors 216 able to determine a location on the display 204 that the user's eyes are focused on. For example, as illustrated in FIG. 3, a user's eyes 300 can be monitored by gaze tracking sensors 216 to determine at any point in time a location on display 204 on which the eyes 300 of the user are focused. For instance, in some implementations, the movement and positioning of the user's irises 302 and pupils 304 are tracked, and this information is used to determine which portion of the display 204 the eyes 300 are focused on, a length time that the eyes are focused on any particular area of display 204, and so forth. This position or focus information is then applied to functions described further below for augmenting the user's video conferencing experience, such as for automatically improving the audio coming from a participant that the user's eyes are focused on. Eye tracking technology suitable for the implementations herein is available from a number of sources, including, but not limited to, SensoMotoric Instruments, GmbH, of Berlin, Germany, and Eye Response Technologies Inc. of Charlottesville, Va.

Furthermore, while a computing device 200 has been described with reference to FIG. 2, it should be noted that the implementations herein are not limited to application on general-purpose computing devices, but are also applicable to dedicated or specialized video conferencing systems. For example, a dedicated video conferencing system would typically be a computing device having many of the same components described above, such as, for example a display, a video camera, speakers, microphone, a processor, memory, and other input devices, as described above. The dedicated video conferencing system can also be outfitted with gaze tracking sensors 216 and appropriate software modules can be incorporated into the video conferencing system, as discussed further below. Accordingly, implementations herein also are applicable to these dedicated video conferencing systems.

Exemplary System Architecture

Figure 4A:
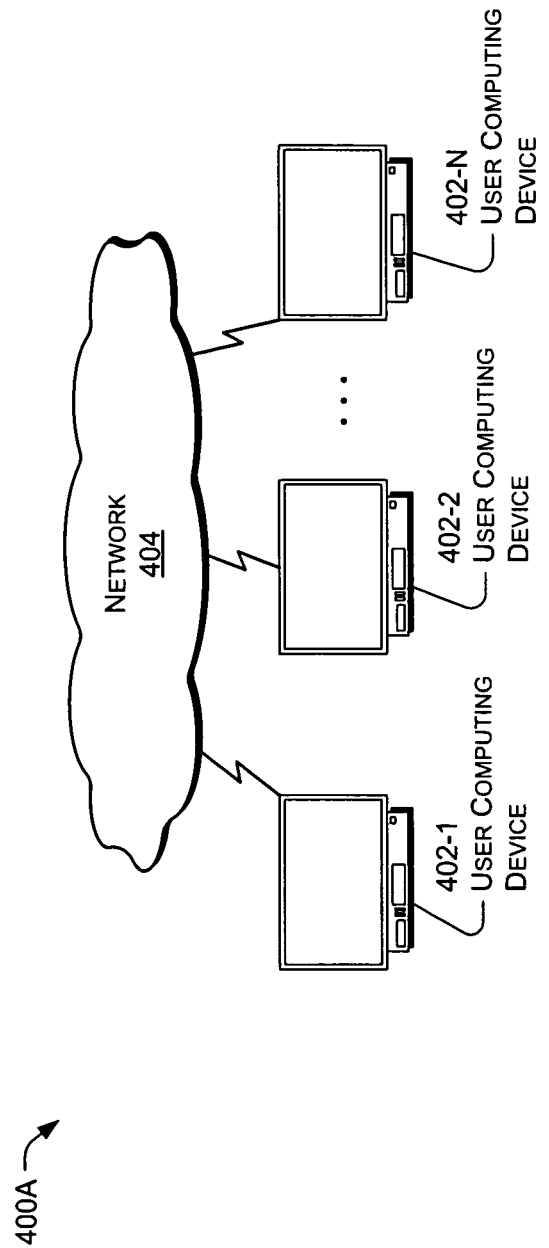

FIG. 4A illustrates one example of a network architecture and system 400A for implementing video conferencing according to implementations herein. To this end, the system 400A includes a plurality of user computing devices 402-1, 402-2, . . . , 402-N in communication with each other, such as via a network 404. Some of these user computing devices 402 can be general purpose computing devices, corresponding to the computing device 200 described above with reference to FIG. 2. Additionally, or alternatively, some of these user computing devices 402 can be dedicated video conferencing computing devices, corresponding to the dedicated video conferencing system described above with reference the computing device 200 of FIG. 2. For example, in the implementations of FIG. 4A, the user computing devices 402 may connect on a peer-to-peer basis in which each user computing device 402 communicates with each other user computing device 402 when participating in a video conference.

Alternatively, in other implementations, as illustrated by network architecture and system 400B of FIG. 4B, the user computing devices 402 may communicate with each other during the video conference via a management computing device 406, which acts as a bridge serving as a multipoint control unit (MCU) or conferencing server. Thus, the user computing devices 402 each communicate with management computing device 406, and the management computing device 406 distributes the received communications to the other computing devices 402 participating in the video conference. In some implementations, management computing device 406 exists as a part of a data center, server farm, network service provider service center, stand alone server, or the like. For example, management computing device 406 may be a server, a personal computer, or a mainframe computer. In other implementations, one of the user computing devices 402 may also serve as the management computing device 406.

The systems 400A, 400B can include any number of user computing devices 402 and/or management computing devices 406. For example, in one implementation, network 404 is the Internet, and the systems 400A, 400B include numerous servers, personal computers (PCs), workstations, terminals, mobile computing devices, dedicated video conferencing systems, and other computing devices spread throughout the world as computing devices 402, 406. In other implementations, network 404 may be an ISDN (integrated services digital network) network or other suitable network type providing sufficient bandwidth to pass video and audio communications in real time. Alternatively, in another possible implementation, the system 400B can include just a single management computing device 406 in communication with a limited number of user computing devices 402 via a LAN (local area network) or a WAN (wide area network), such as within a single company, or the like. Similarly, the system 400A could include just a small number of PCs in communication via a private LAN or WAN. In some implementations, user computing devices 402 are personal computers, workstations, terminals, mobile computing devices, such as PDAs (personal digital assistants), cell phones, smartphones, laptops, palmtops, or the like.

The user computing devices 402 can be coupled to each other and/or to the management computing device 406 in various combinations through wired and/or wireless networks, including a LAN, WAN, the Internet, or any other networking technology known in the art. In a networked environment, such as that illustrated in FIGS. 4A and 4B, program modules for carrying out implementations herein, as described further below, or portions thereof, may be stored in a remote memory storage device of a remote computer, such as management computing device 406, and accessed by user computing devices 402 when needed. Furthermore, while exemplary architectures are illustrated in FIGS. 4A and 4B, it should be understood that other suitable architectures may also be used, and that implementations herein are not limited to any particular architecture.

Exemplary Logical and Hardware Configurations of User Computing Devices

Figure 5:
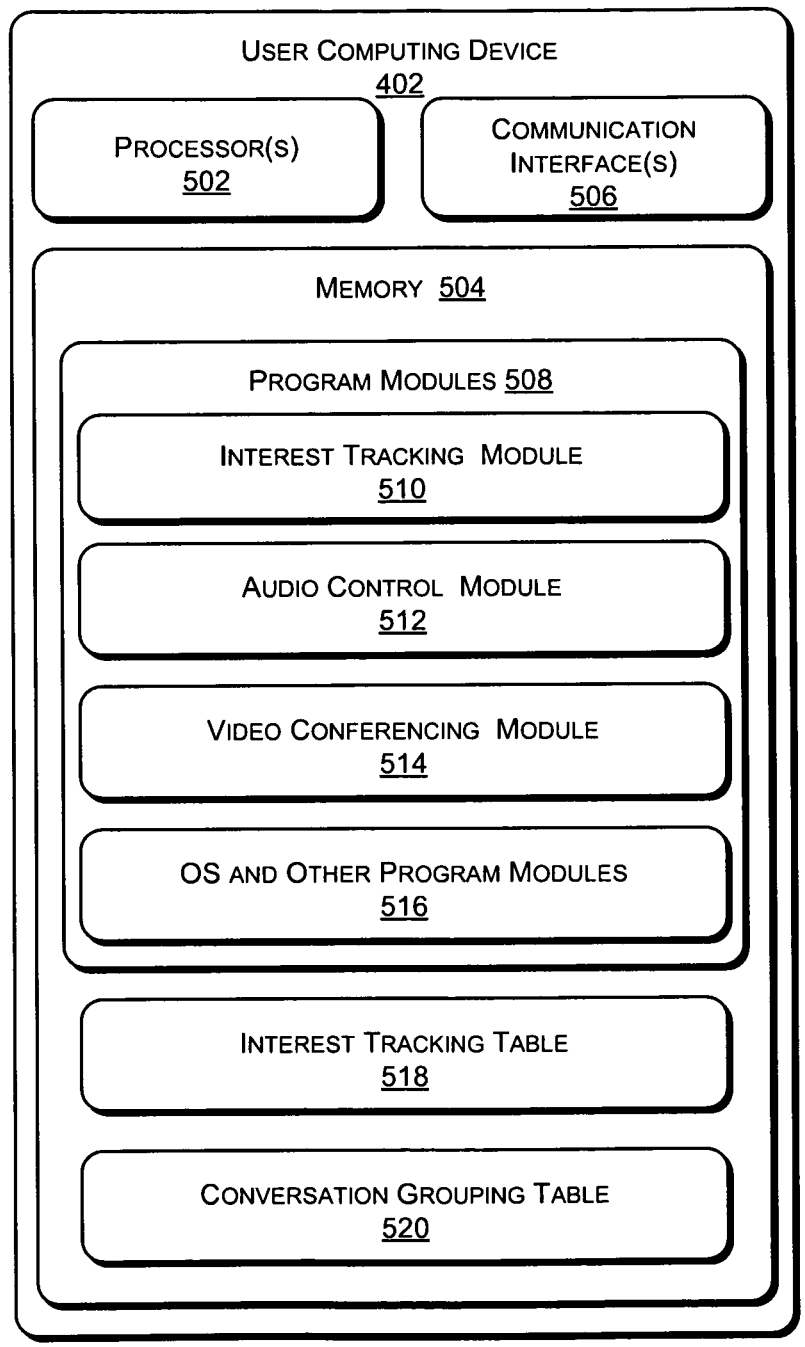
FIG. 5 illustrates an exemplary logical and hardware configuration of a user computing device according to some implementations.

FIG. 5 illustrates an exemplary logical and hardware configuration of a user computing device 402 for carrying out implementations described herein. In the illustrated example, user computing device 402 includes one or more processors 502, a memory 504, and one or more communication interfaces 506. The processor(s) 502 can be a single processing unit or a number of processing units, all of which can include multiple computing units. The processor(s) 502 may be implemented as one or more microprocessors, microcomputers, microcontrollers, digital signal processors, central processing units, state machines, logic circuitries, and/or any devices that manipulate signals based on operational instructions. Among other capabilities, the processor(s) 502 can be configured to fetch and execute computer-readable instructions stored in the memory 504 or other computer-readable storage media.

The memory 504 can include any computer-readable storage media known in the art including, for example, volatile memory (e.g., RAM) and/or non-volatile memory (e.g., flash, etc.), mass storage devices, such as hard disk drives, solid state drives, removable media, including external and removable drives, or the like. The memory 504 stores processor-executable program instructions or code that can be executed by the processor(s) 502 for carrying out the services, methods and functions described herein.

The communication interface(s) 506 facilitate communication between the user computing devices 402 and/or management computing device 406. The communication interface(s) 506 can facilitate communications within a wide variety of networks and protocol types, including wired networks (e.g., LAN, cable, etc.) and wireless networks (e.g., WLAN, cellular, satellite, etc.). In one implementation, the user computing device 402 can send and receive video and audio communications through the communication interface(s) 506, and the user computing device 402 can also receive and send interest tracking information regarding the user and other participants, as described further below.

Memory 504 includes a plurality of program modules 508 stored therein and executable by processor(s) 502 according to implementations herein. Program modules 508 include an interest tracking module 510, for determining a focus or object of interest of the user during a video conference, an audio control module 512 for managing the audio delivered to the user during the video conference, such as in the peer-to-peer implementations, and a video conferencing module 514 for controlling video and audio communications during video conferencing. In some implementations, interest tracking module 510 and audio control module 512 may be part of video conferencing module 514, while in other implementations they may be separate modules, as shown. Memory 504 may also include an operating system (OS) and other program modules 516, such as video and audio communication software, other applications, drivers, and the like. In addition, memory 504 also stores an interest tracking table 518 and a conversation grouping table 520 maintained by interest tracking module 510 for determining which participants are currently looking at which other participants and for determining which conversation groups participants are members of for implementing the augmented audio service provided by audio control module 512. Further, while an exemplary implementation has been described, it will be appreciated that other implementations are not limited to the particular logical and hardware configuration illustrated in FIG. 5.

Exemplary Logical and Hardware Configuration of Management Device

Figure 6:
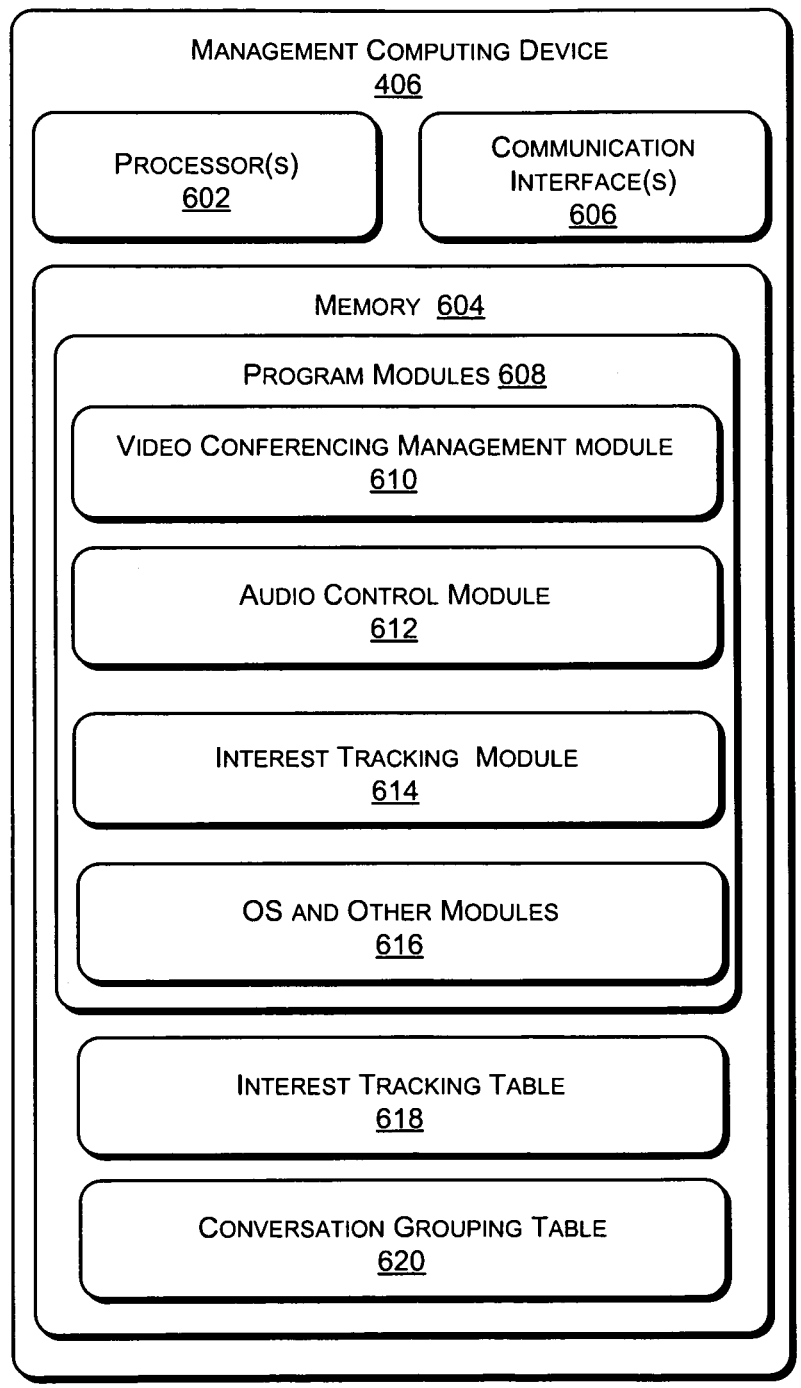
FIG. 6 illustrates an exemplary logical and hardware configuration of a management computing device according to some implementations.

FIG. 6 illustrates an exemplary hardware and logical implementation of management computing device 406 for acting as an MCU and providing augmented audio based on the implementations described herein. In the illustrated example, management computing device 406 includes one or more processors 602, a memory 604, and one or more communication interfaces 606. The processor(s) 602 can be a single processing unit or a number of processing units, all of which could include multiple computing units. The processor(s) 602 may be implemented as one or more microprocessors, microcomputers, microcontrollers, digital signal processors, central processing units, state machines, logic circuitries, and/or any devices that manipulate signals based on operational instructions. Among other capabilities, the processor(s) 602 can be configured to fetch and execute computer-readable instructions stored in the memory 604 or other computer-readable storage media.

The memory 604 can include any computer-readable storage media known in the art including, for example, volatile memory (e.g., RAM) and/or non-volatile memory (e.g., flash, etc.), mass storage devices, such as hard disk drives, solid state drives, removable media, including external and removable drives, or the like. The memory 604 stores processor-executable program instructions or code that can be executed by the processor(s) 602 for carrying out the services, methods and functions described herein.

The communication interface(s) 606 facilitate communication between the management computing device 406 and user computing devices 402. For example, the communication interface(s) 606 may include one or more ports for connecting to a number of user computing devices 402. The communication interface(s) 606 can facilitate communications within a wide variety of networks and protocol types, including wired networks (e.g., LAN, cable, etc.) and wireless networks (e.g., WLAN, cellular, satellite, etc.). In some implementations, the management computing device 406 manages video and audio connections between a plurality of user computing devices 402 connected via an IP (Internet Protocol) network, e.g., the Internet, for managing a video conference between a plurality of participants, as discussed above with respect to FIG. 1. Furthermore, while the Internet is the most commonly used network connection type, other types of network connections may be used such as ISDN, or the like.

Memory 604 includes a plurality of program modules 608 stored therein and executable by processor(s) 602 for carrying out implementations herein. Program modules 608 include a video conferencing management module 610 for establishing and managing a video conference between a plurality of user computing devices 402. Memory 604 also includes an audio control module 612 for managing audio delivered to the user computing devices 402 according to implementations herein. Memory 604 also includes an interest tracking module 614 for receiving and managing interest information received from each participant to the video conference. Memory 604 also includes an operating system (OS) and other modules 616, such as communication software, drivers, and the like. Memory 604 may further include an interest tracking table 618 and a conversation grouping table 620 that are maintained by interest tracking module 614 for determining which participants are currently looking at which other participants and for determining which conversation groups participants are members of for controlling the audio to each of the participants, as described additionally below. Furthermore, in some implementations, the video conferencing management module 610, audio control module 612 and interest tracking module 614 may be contained in one of the user computing devices 402 for enabling one of those to act as the management computing device. Other variations will also be apparent to those of skill in the art, and thus, implementations disclosed herein are not limited to the particular example illustrated.

Figure 7:
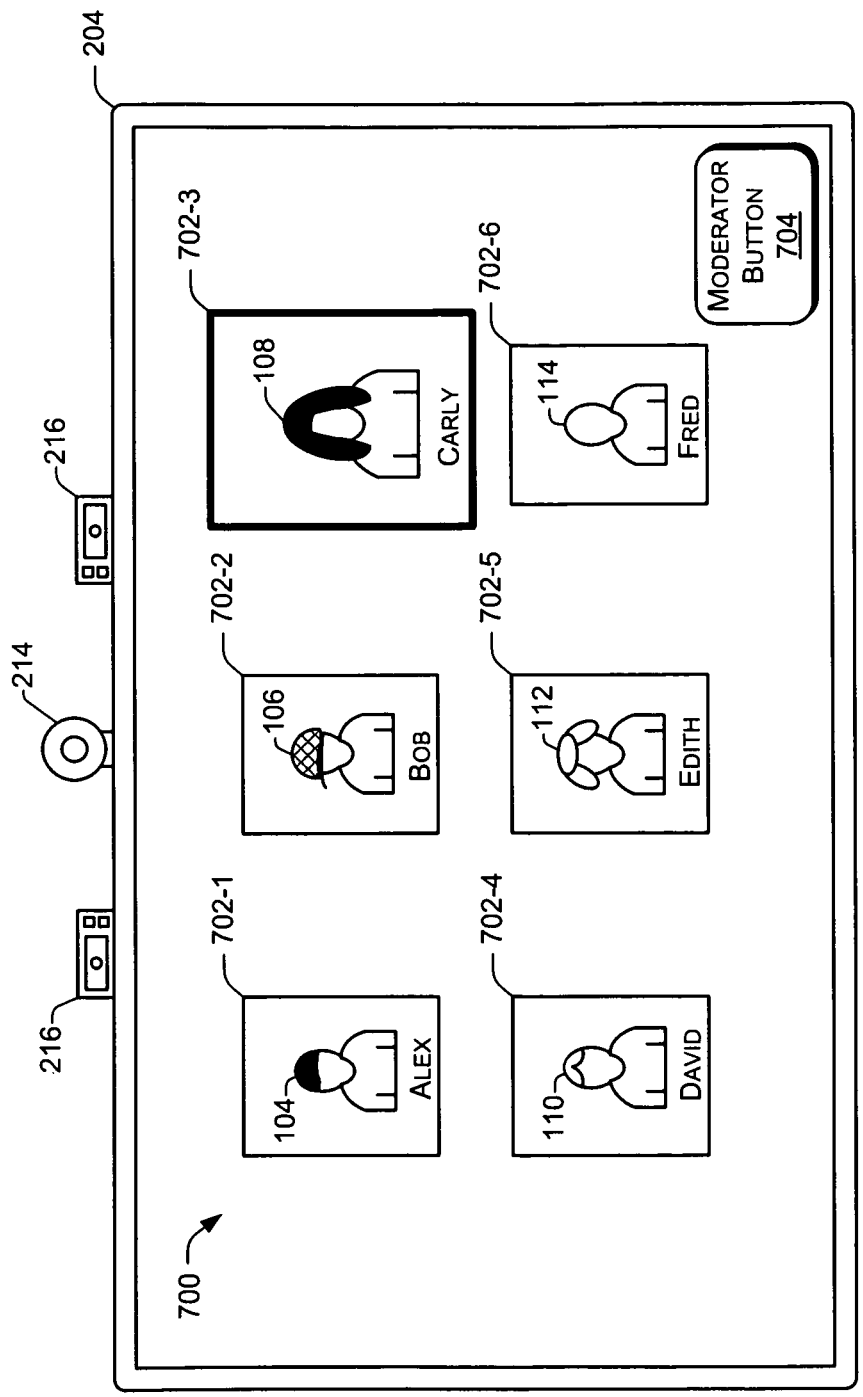
FIG. 7 illustrates an exemplary user interface for augmentation during video conferencing according to some implementations herein.

FIG. 7 illustrates an exemplary video conferencing user interface 700 according to some implementations herein. User interface 700 may include video images 702-1, . . . , 702-6 of each of the participants 104-114, respectively, to the video conference. Additionally, although not illustrated here, in other implementations, the listening party's video image may also be displayed in the user interface 700. Referring back to the situation discussed above with reference to FIG. 1, in which multiple parties are talking at the same time, such as the conversation 118 between Carly 108 and Bob 106, and the conversation 120 between David 110 and Edith 112, the listening party 116 might tend to look at the video image 702-3 of Carly 108, because Carly 108 might be speaking about something that interests the listening party 116. Thus, as illustrated in FIG. 7, the listening party 116 will focus his or her eyes on the video image 702-3 of Carly 108. The gaze tracking sensors 216 and interest tracking module 510 determine that the listening party is focusing on the video image 702-3 of Carly 108, and provide this information to the audio control module 512. In response, audio control module 512 can augment the audio of the conversation 118 between Carly 108 and Bob 106, such as by increasing the gain for audio from Carly 108, or by decreasing the gain in audio from other participants that are currently speaking, such as David 110 and Edith 112. Furthermore, user interface 700 can be configured to interact with the information determined by interest tracking module 510. For example, as illustrated in FIG. 7, when it is determined that a particular video image 702 displayed on the user interface 700 is the focus of the listening party's attention, i.e., the party of interest to the listening party, this video image may be highlighted, enlarged compared to the other images, or otherwise visually distinguished to the listening party in the user interface 700, as illustrated by the enlarged and highlighted video image 702-3, to indicate that the particular video image 702-3 has been determined by the system to be the listening party's current party of interest. This provides visual feedback to the listening party, thereby providing the listening party with some additional control over which participant's audio feed is augmented.

Furthermore, as illustrated in FIG. 8A, the gaze tracking information and/or other interest tracking information gathered from the user computing devices of some or all of the participants can be collected in an interest tracking table 518, 618 and the interest tracking information can then be used to identify a conversation that a party is listening to and/or participating in so that the audio to each participant to the video conference can be appropriately augmented. Interest tracking table 518, 618 includes a participant identifier (ID) column 802 that identifies the name, phone number, or other ID of each of the participants to the video conference having gaze tracking or other interest tracking enabled. A current focus column 804 indicates which participant of the video conference that each of the other participants is currently looking at or has otherwise indicated an interested in, as detected by each participant's gaze tracking sensors or other gathered interest information. For example, in some implementations, a user may manually indicate an interest in a participant, as discussed further below.

A time column 806 can be used to track an amount of time that each participant has been looking at the participant indicated in the current focus column 804 for determining which participant is listed as a party of interest in a party of interest column 808. For example, a minimum time threshold or time widow (e.g., ten seconds) can be required before a particular party that is a current focus 804 also becomes the party of interest 808. By setting a minimum threshold time period to change the party of interest 808, then when a particular participant looks around at the other participants briefly, looks off screen, or the like, the audio feed to that particular participant will not abruptly fluctuate. For instance, Alex might have been looking at and listening to Carly, and thus, Carly is listed as the party of interest 808 for Alex in FIG. 8A. However, Alex may want to see how Bob reacts to what Carly is saying, so Alex can glance at Bob for a brief period of time, less than the predetermined change time threshold, without having Alex's party of interest 808 changed from Carly to Bob. Thus, as illustrated in FIG. 8A, Alex has been detected as looking at Bob for three seconds. Since this is less than the threshold time period of ten seconds in this example, Carly remains as Alex's party of interest 808.

Additionally the threshold time period might be longer if Bob is not speaking, but if the participant identified as the current focus 804 is speaking also, the threshold time period can be a shorter time period. For example, if David is speaking, and Alex looks at David for the shorter threshold time period (e.g., two seconds), David will become the Alex's new party of interest after only two seconds, since it is possible that the Alex is trying to listen to what David is saying. In addition, as illustrated by Fred in FIG. 8A, if the current focus is determined to be off screen or not one of the participants of the video conference, the party of interest for Fred might remain as the most-recently determined party of interest (i.e., David) until the Fred's current focus 804 returns to one of the participants of the video conference.

Further, the information in interest tracking table 518, 618 can be used to identify conversations and members of conversation groups so that the audio for all participants of a conversation can be enhanced to all other participants of an identified conversation grouping, rather than just having the audio from a single party enhanced. As illustrated in FIG. 8B, conversation grouping table 520, 620 is created based on the interest information obtained from the interest tracking table 518, 618 for identifying a conversation group that each participant is participating in or listening to. Conversation grouping table 520, 620 includes a conversation group ID column 812 that identifies a conversation grouping for a conversation, and a participant column 814 that identifies the participants currently participating in or listening to the corresponding conversation. Which participant is participating in which conversation group is determined based upon the party of interest 808 for each participant identified in the interest tracking table 518, 618. Thus, one or more on-going conversations can be determined based upon the gathered interest tracking information, with each identified conversation being a union of all participants looking at each other recently for longer than the minimum threshold time period discussed above. For example, each conversation group can be made up a subset of participants out of the total participants participating in the video conference based on the participants' implied interest in one of a plurality of ongoing conversations, as determined from the gathered interest information. The specifics for determining which participant is a member of which conversation group are described additionally below with reference to FIG. 9.

Figure 9:
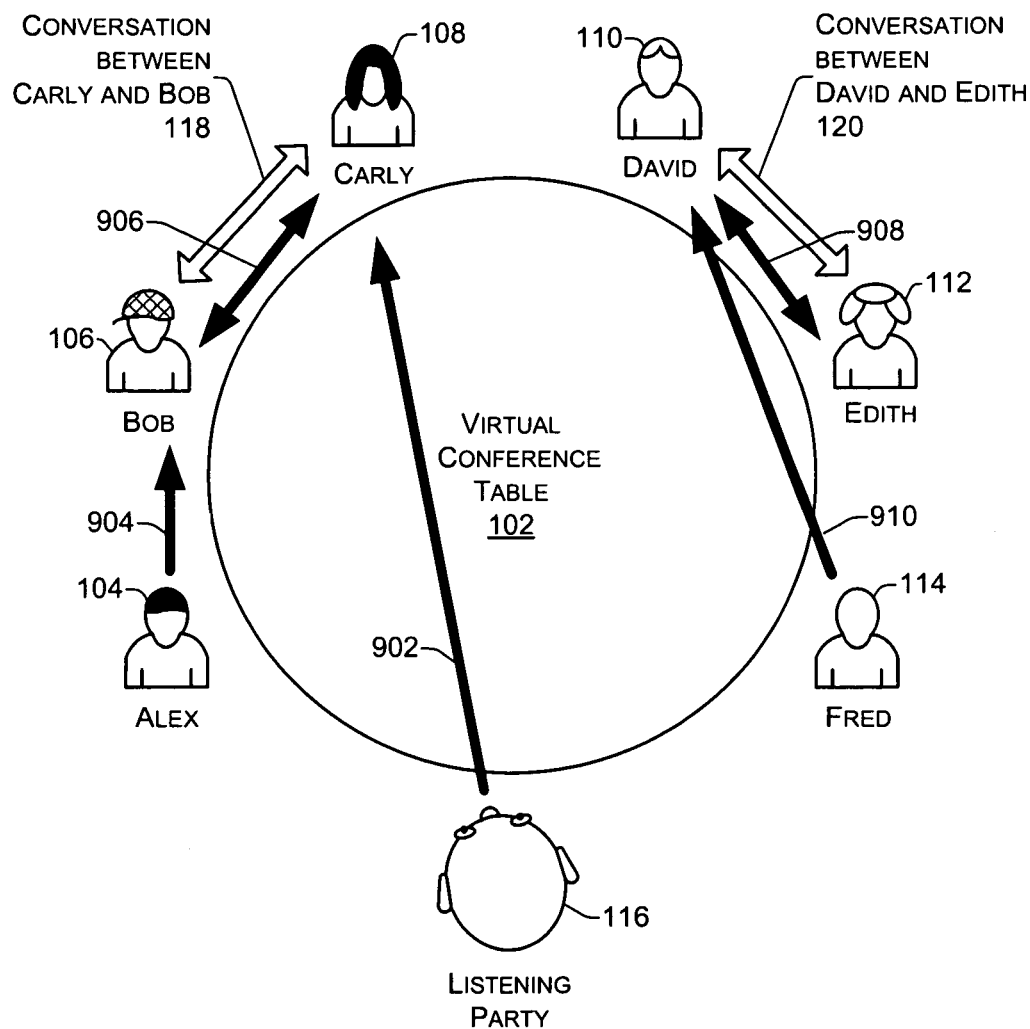
FIG. 9 illustrates an exemplary virtual video conference according to some implementations.

As illustrated in FIG. 9, the listening party 116 is looking at Carly 108 to listen to the conversation 118 between Carly 108 and Bob 106, as indicated by arrow 902. Alex 104 had been looking at Carly, but as described above with reference to FIG. 8A, is now looking at Bob 106 as indicated by arrow 904 to determine Bob's reaction to what Carly is saying. Further, because Carly 108 and Bob 106 are talking to each other, Carly 108 is looking at Bob 106 and Bob 106 is looking at Carly 108, as indicated by arrow 906. Thus, because Alex, Bob, Carly and the listening party are all looking at another member of this group, as determined from the party of interest column 808, they can be identified as participating in or listening to a first conversation grouping. As a member of this conversation grouping, when any member speaks, the audio is augmented to all other members of the conversation group. Accordingly, the audio from Carly 108 is augmented to Alex 104, Bob 106 and the listening party 116. Further, when Bob 106 speaks, the audio from Bob is also augmented to Alex 104, Carly 108 and the listening party 116. Thus, the interest tracking information of table 518, 618 can be used to identify conversations and participants that are participating in or listening to the conversation based on the implication that if particular participant is looking for a predetermined time threshold at someone who is talking, or looking at someone for a predetermined time threshold who is looking at the participant who is talking, then the particular participant is interested in the conversation and should be included in the conversation grouping for that conversation.

As another example, David 110 and Edith 112 are talking to each other, so they are looking at each other, as indicated by arrow 908. Further, Fred 114 is interested in their conversation and is looking at David 110. Thus, the audio from David 110 is augmented to Fred 114. When David stops speaking and Edith 112 responds, the audio from Edith 112 is augmented to David 110 because David is looking at Edith, and also augmented to Fred 114 because Fred is looking at David who is looking at Edith. Thus, David Fred and Edith are grouped as a second conversation grouping. Accordingly, both sides of the conversation 120 between David 110 and Edith 112 are augmented to Fred 114, and should Fred 114 speak, then his audio will be augmented to David and Edith, but not to the other participants in video conference. Furthermore, for example, should someone from the first conversation grouping, such as Alex, look at someone from the second conversation grouping, such as Fred, for longer than the threshold time period, then Alex is removed from the first conversation grouping and added to the second conversation grouping, so that audio between Alex and David, Edith and Fred is now augmented.

Figure 10:
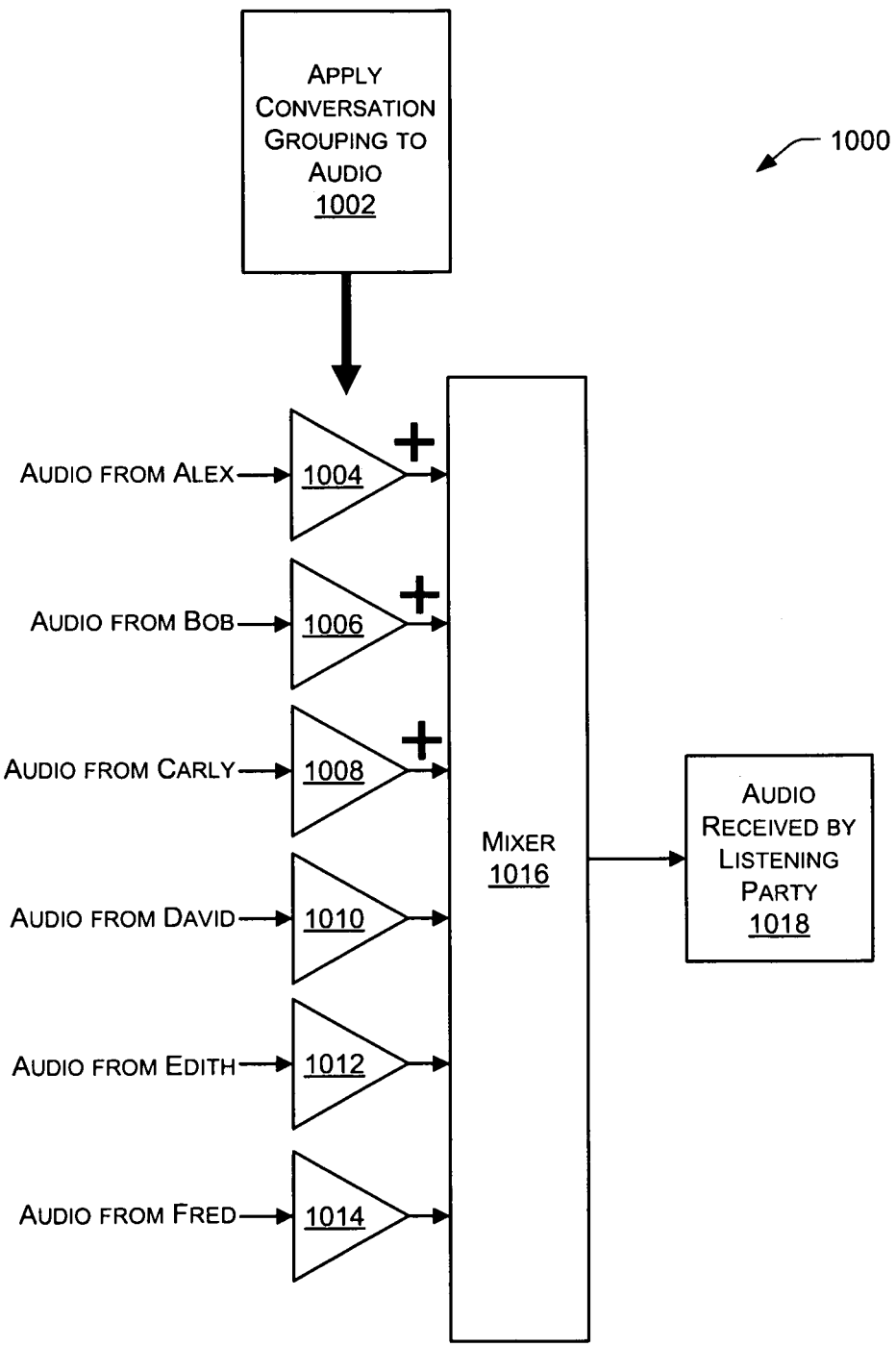
FIG. 10 illustrates an exemplary schematic for enhancing audio for particular participants according to some implementations.

FIG. 10 illustrates a simplified schematic for explanation purposes showing augmenting of audio to the listening party. This augmentation can take place at either the management computing device 406 in those implementations incorporating a management computing device, or alternatively, for the peer-to-peer implementations, at the listening party's user computing device 402. In FIG. 10, the audio for each party is received, and the interest tracking table 518, 618 is used to determine interest information for the listening party to be applied the corresponding audio feeds. In the example set forth in FIGS. 8A, 8B and 9, it has been determined that the listening party 116 is looking at Carly 108, that Carly is looking at Bob 106, and that Alex 104 is looking at Bob. Therefore, the interest information for the listening party 116 indicates that the listening party 116 should be grouped in the first conversation grouping with Alex 104, Bob 106 and Carly 108. Accordingly, as indicated at block 1002, the conversation grouping is applied to augment the audio to the listening party received from Alex 104, Bob 106 and Carly 108, while audio received from David 110, Edith 112 or Fred 114 is not augmented. This audio augmentation may be accomplished in a number of ways, such as by increasing the gain on the audio from Alex 104, Bob 106 and Carly 108, or by decreasing the gain on the audio from the other participants. In the illustrated implementation, the gain in the audio from Alex 104, Bob 106 and Carly 108 is increased by a predetermined amount, as indicated by amplifiers 1004, 1006 and 1008, while there in no increase in the gain of the audio from the other participants, as indicated by amplifiers 1010-1014. The audio from all the participants is then input to a mixer 1016 and delivered to the listening party in a conventional manner, as indicated at block 1018. It should be noted that while separate amplifiers 1004-1014 are illustrated, the relative gain adjustments can be implemented in software by audio control module 512 or audio control module 612, depending on the implementation. Further, while a particular method for augmenting the audio of one or more particular participants out of a plurality of participants has been described, it will be appreciated by those of skill in the art that other methods for augmenting audio are also included in the scope of the disclosure herein.

In addition, because the system is able to determine a conversation grouping for a conversation that each participant is participating in or listening to, the system can augment the listening party's audio output to Alex 104, Bob 106 and Carly 108, while not augmenting the audio output from the listening party to David 110, Edith 112 or Fred 114. Thus, each member of an identified conversation grouping 812 has audio from the other participants to the conversation augmented and vice versa, while audio to or from parties that are not part of the same conversation grouping is not augmented. Further, by choosing to look at a particular participant, the listening party is able to choose one or more participants to which his or her voice is augmented. For example, if the listening party wants to have his or her voice augmented to Fred, then by looking at Fred, the listening party's voice will be augmented to Fred.

In addition, in some implementations, one or more of the parties might be given a moderator or supervisor power to act as a moderating party. Thus, the moderating party might have the power to increase the gain of his or her audio output automatically to all the participants of the video conference upon activating a moderator button 704 or other command on the user interface 700. In this manner, the moderating party is able to obtain the attention of all the other parties of the video conference, such as for bringing the meeting to order, making an announcement, or the like.

Furthermore, in some instances, the gaze tracking sensors 216 and interest tracking module 510 might not be able to accurately distinguish which participant the listening party is currently focused on, for example, when there are a large number of closely-spaced video images on the display. In such a case, the interest tracking module 510 checks the audio feeds from the participants whose video images are displayed in the approximate area that the user is gazing at. If one of the participants in the approximate area is currently speaking, the interest tracking module 510 selects the participant that is speaking as the focus of the user's interest. In other words, the participant whose audio feed shows that he or she is currently talking is determined to be the current party of interest when the interest tracking module cannot otherwise decide between two or more parties. Further, if multiple parties are speaking in the approximate area determined to be of interest, then the gain for all those parties can be increased. Additionally, in some implementations, such as if a particular party of interest cannot be determined, the gain might be increased according to a Gaussian distribution for participants located around a determined point of focus of the user. Other variations will also be apparent to those of skill in the art in light of the disclosure herein.

In addition, while gaze tracking has been described as the technique for identifying a participant's party of interest, in other implementations, the party of interest may be identified using interest tracking information obtained by other methods. For example, referring to the user interface 700 of FIG. 7, the listening party might alternatively indicate which of the participants is a party of interest by hovering a cursor from a mouse or other pointing device over the video image of the participant of interest, clicking on the video image of the participant of interest, or by some other manual method, such as by touching a finger to a touch screen. This manual indication by the user can then be collected by the interest tracking module and provided to the interest tracking table 518, 618 for use in the same manner as described above. In addition, the system may allow a combination of gaze tracking and manual interest indication, for example, if the user is looking down during the video conference to read something, or otherwise not able to use the gaze tracking feature for all or part of the video conference. However, it should be noted that these manual methods require positive action on the part of the user, and therefore lack the natural interaction and automatic ease of use of the gaze tracking implementations.

Figure 11:
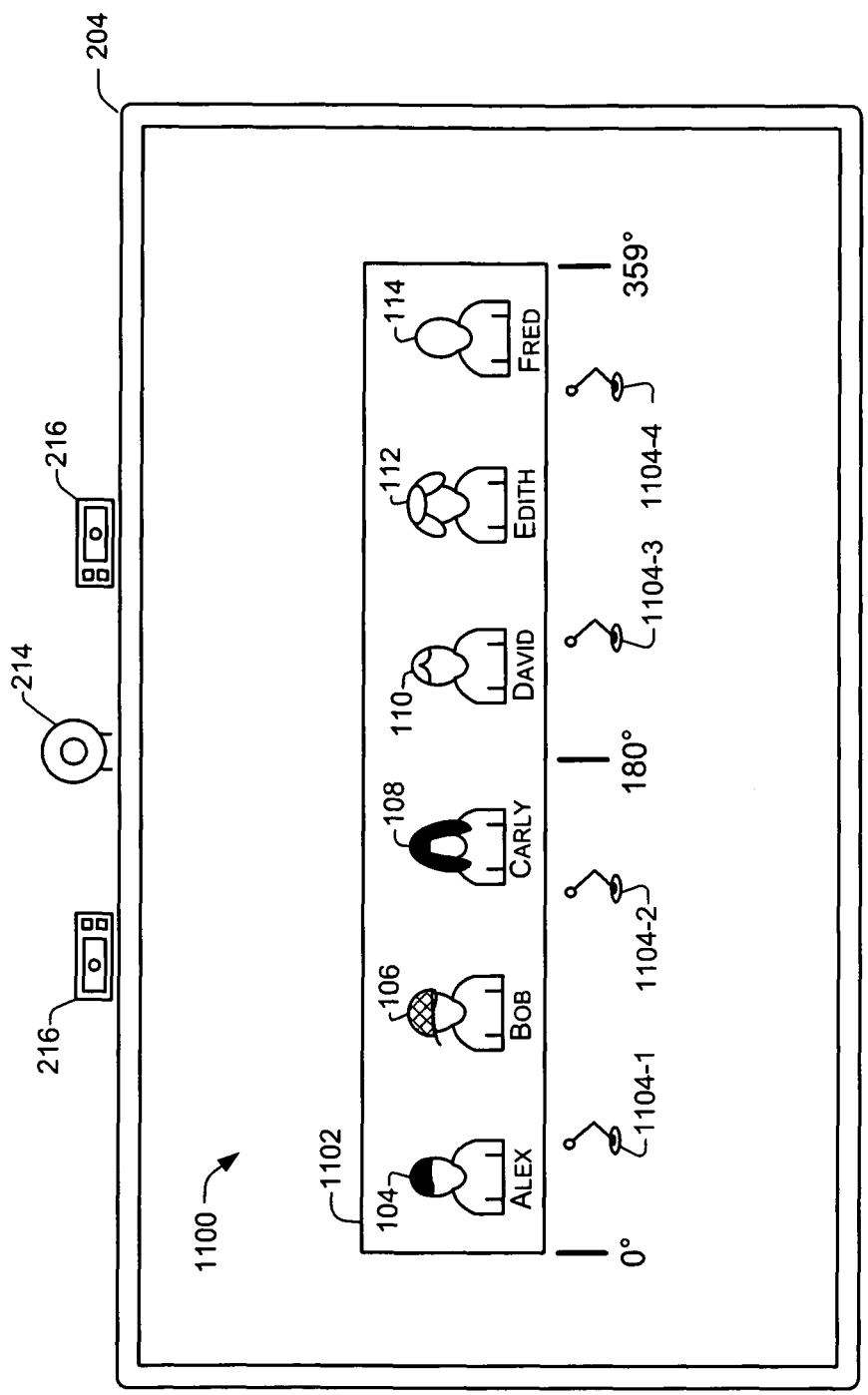
FIG. 11 illustrates another exemplary graphic user interface having a panoramic view according to some implementations.

FIG. 11 illustrates another implementation of a graphic user interface 1100 that displays a panoramic type video conference in which the participants 104-114 are sitting around an actual conference table and video of the participants is displayed as a 360-degree panoramic video view 1102 on the display 204 of the user computing device, such as is available through the use of Microsoft RoundTable™ technology available from Microsoft Corp. of Redmond, Wash. At the conference table, there are four microphones 1104-1, . . . , 1104-4 distributed around the table. In this scenario, when a participant of interest to the listening party is identified, such as by gaze tracking as discussed above, the gain from one or two of the microphones in closest proximity to the identified party of interest is increased. For example, if Bob 106 is identified as a particular participant in whom the listening party is interested in listening to, then the gain from microphones 1140-1 and 1104-2 can be increased during audio transmission to the listening party so that the listening party is better able to hear Bob. Other variations will also be apparent to those of skill in the art in light of the disclosures herein.

Exemplary Peer-to-Peer Process

Figure 12:
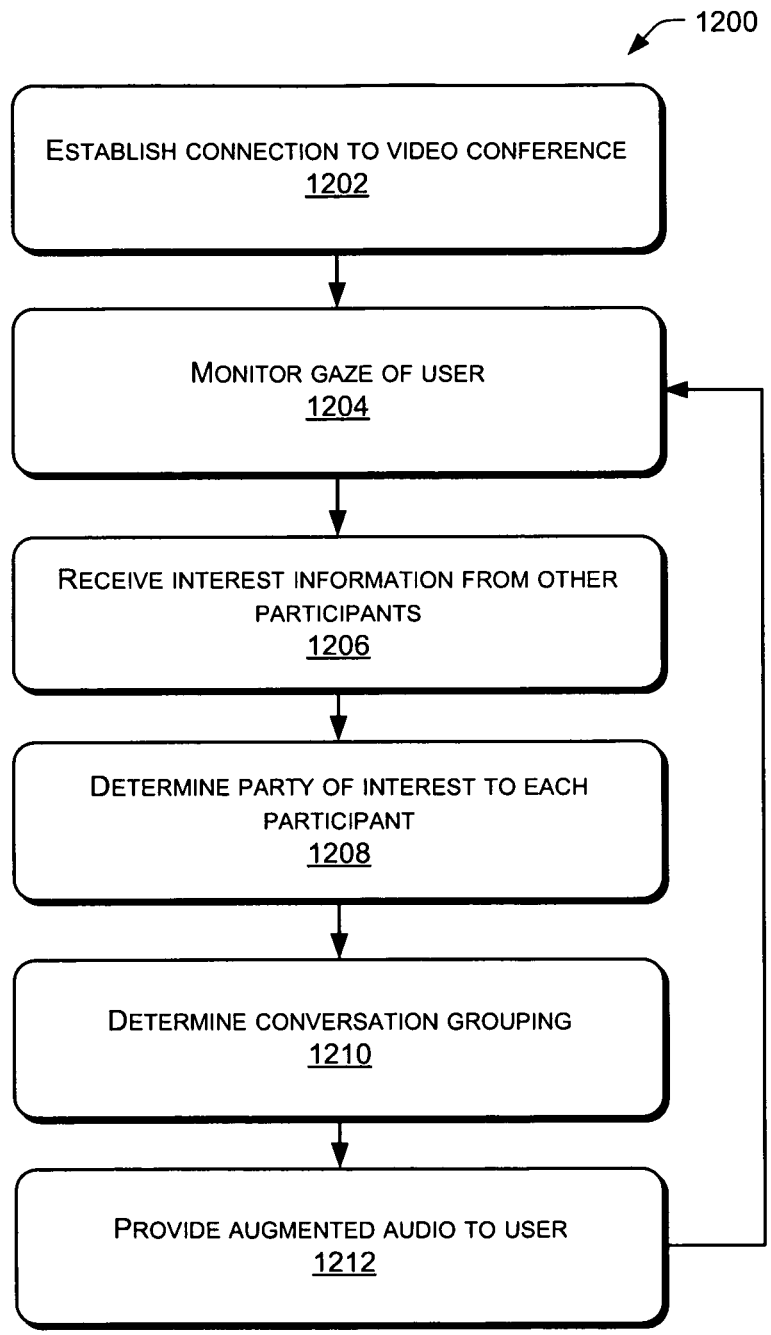
FIG. 12 illustrates a flowchart of an exemplary process carried out by a user computing device according to some implementations.

FIG. 12 illustrates an exemplary process 1200 implemented on a user computing device 402 for carrying out some of the implementations described herein, such as for the peer-to-peer implementations and portions of the central management implementations. Process 1200 may be implemented by processor(s) 502 executing instructions for interest tracking module 510, audio control module 512 and video conferencing module 514 stored in memory 504 of the user computing device 402.

At block 1202, connection to the video conference is established. For example, one of the participants 104-116 might sequentially call the other participants to establish the video conference, or the like.

At block 1204, the interest tracking module 510 monitors the gaze of the user of the user computing device to determine a party of interest of the user. For example, when the user's gaze has been focused on a particular video image of one of the participants for a predetermined amount of time, that participant will be determined to be the party of interest for the user. This determination of the party of interest might also be indicated on the graphic user interface of the user's display, for example, by highlighting the video image of the party of interest, enlarging the video image, or by other indication, as discussed above. Alternatively, a manual interest indication might be made by the user, such as by touching the screen or using a mouse. The interest information is added to the interest tracking table.

At block 1206, interest information is also received at the user computing device from the other participants of the video conference. For example, each user computing device participating in the video conference can maintain an interest tracking table 518, indicating which party of the video conference each other participant is interested in listening to. As described above, this information can then be used to augment the audio originating from appropriate participants. For example, each participant's user computing device might transmit party of interest information to the other participants' user computing devices as a separate data communication, such as when the interest tracking module 510 on each participant's user computing device identifies a party of interest or a change in the party of interest at that user computing device. In other implementations, the interest information might be transmitted on a regular periodic basis. Other variations will also be apparent to those of skill in the art in light of the disclosed herein.

At block 1208, the process determines one or more parties of interest to the user and the other participants. For example, based upon the interest information returned by monitoring the gaze of the user, and upon the received interest information received from the other participants, the process can determine the party of interest to each participant in the video conference.

At block 1210, the process determines conversation grouping for the participants to the video conference based upon the determined party of interest for each participant. As discussed above with respect to FIGS. 8B and 9, based upon the determined party of interest for each participant, a conversation grouping is identified so that audio to and from the members of a conversation grouping is augmented for the other members of the conversation group, but not for the video conference participants that are members of a different conversation group.

At block 1212, the process enhances the audio to the participants of the video conference according to the conversation groupings so that the audio output from the user is augmented to only the participants in the same conversation grouping and audio received from the participants of same conversation grouping by the user is also augmented, while audio received from members of a different conversation group is not augmented. Thus, it may be seen that the process is able to continually monitor the gaze of the user or other interest information to determine one or more participants of interest to the user at any particular point in time and augment the audio to the user based upon the determination. Each user computing device 402 that is party to the video conference and that is equipped with the gaze tracking sensors and/or modules described herein may similarly automatically augment the audio to the users of those particular user computing devices 402. Further, user computing devices 402 that do not have the gaze tracking equipment may still enhance the audio to the user based upon manual indications of interest in one or more participants received from those users.

Exemplary Central Management Process

Figure 13:
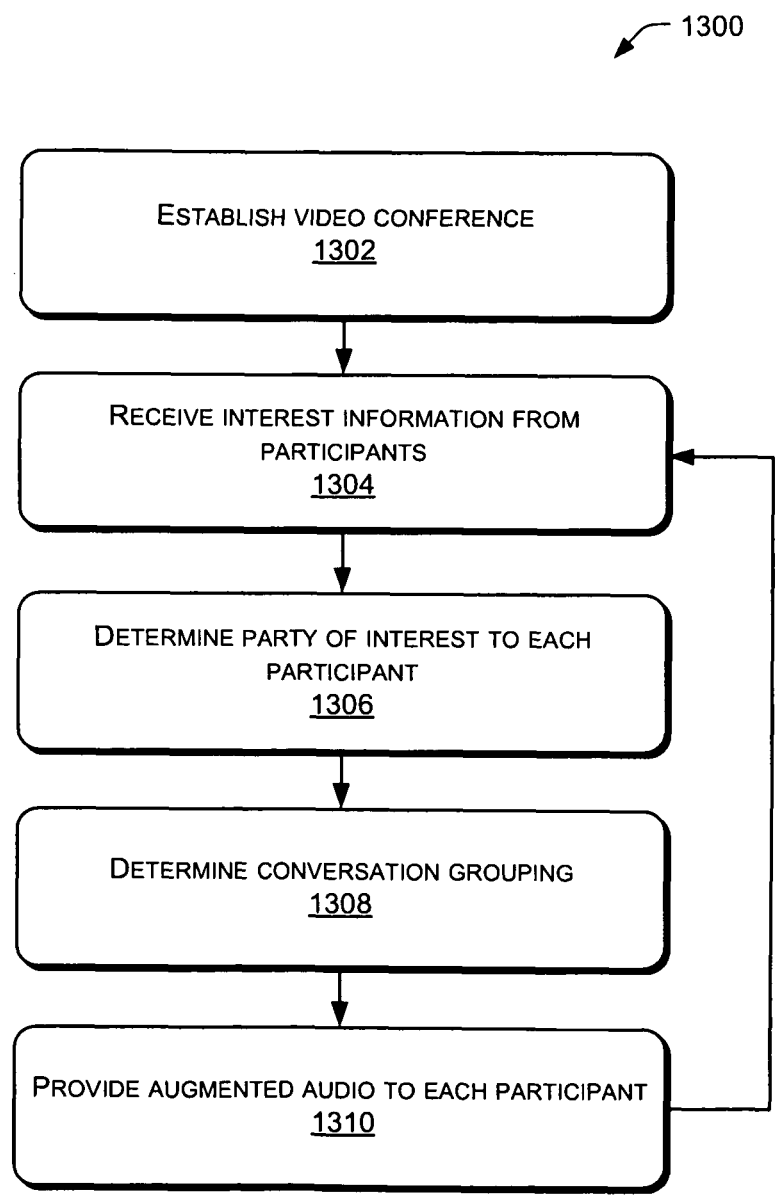
FIG. 13 illustrates a flowchart of an exemplary process carried out by a management computing device according to some implementations.

FIG. 13 illustrates an exemplary process 1300 implemented on management computing device 406 for carrying out some of the implementations described herein, such as for the centrally-managed implementations. Process 1300 may be implemented by processor(s) 602 executing instructions for video conferencing management module 610 and audio control module 612 stored in memory 604 of the management computing device 406.

At block 1302, management computing device 406 establishes the video conference, such as by receiving calls from each of the participants, by placing calls to each of the participants sequentially, or the like.

At block 1304, management computing device 406 receives gaze tracking information or manual interest information from each of the parties participating in the video conference. For example, this interest information might be passed to the management computer as a separate data communication, such as when the interest tracking module on each participant's computing device identifies a party of interest or a change in the party of interest. In other implementations, the information might be transmitted on a regular periodic basis. Other variations will also be apparent to those of skill in the art in light of the disclosed herein.

At block 1306, management computing device 406 determines a party of interest to each of the participants as discussed above, such as with respect to FIGS. 8A and 9. For example, by referring to the interest tracking table 618 maintained by the interest tracking module 614, one or more participants that are a current party of interest to each participant can be determined.

At block 1308, conversation grouping is determined for the participants to the video conference. As discussed above with respect to FIGS. 8B and 9, based upon the determined party of interest for each participant, a conversation grouping is identified so that audio to and from the members of a conversation is augmented for the other members of the conversation group, but not for the video conference participants that are members of a different conversation group.

At block 1310, management computing device 406 augments the audio to each participant according to the conversation groupings determined at block 1308. This process can be carried out and updated continually throughout the video conference, as the party of interest to of each of the participants changes during the course of the video conference.

Exemplary Module Implementations

The modules described above, including interest tracking module 510, audio control module 512, video conferencing module 514, video conferencing management module 610, audio control module 612, and interest tracking module 614 can be employed in many different environments and situations for audio conferencing. Generally, any of the functions described with reference to the figures can be implemented using software, hardware (e.g., fixed logic circuitry), manual processing, one or more particular machines, or a combination of these implementations. The term "logic, "module" or "functionality" as used herein generally represents software, hardware, or a combination of software and hardware that can be configured to implement prescribed functions. For instance, in the case of a software implementation, the term "logic," "module," or "functionality" can represent program code (and/or declarative-type instructions) that performs specified tasks when executed on a processing device or devices (e.g., CPUs or processors). The program code can be stored in one or more computer-readable memory devices or media. Thus, the methods and modules described herein may be implemented by a computer program product. The computer program product may include computer-readable storage media having a computer-readable program code embodied therein. The computer-readable program code is adapted to be executed by one or more processors to implement the methods and/or modules of the implementations described herein. The terms "computer-readable storage media", "processor-accessible storage media", or the like, refer to any kind of machine storage medium for retaining information, such as a the various kinds of storage devices discussed above.

FIGS. 2, 4A, 4B, 5 and 6 illustrate computing devices and functionalities that can be used to implement the modules described herein. As discussed above, these computing devices include one or more processors, memories, and communication interfaces. Some implementations can further include displays, other input/output (I/O) devices, mass storage devices, and the like. For instance, memories 504, 604 are examples of computer-readable storage media described above for storing instructions which perform the various functions described above when executed by the processing devices 502, 602. The computing devices described herein are only examples of suitable devices, and are not intended to suggest any limitation as to the scope of use or functionality of the implementations described herein for providing augmented audio. Further, reference in the specification to "one implementation", "this implementation", "these implementations" "some implementations" or "implementations" means that a particular feature, structure, or characteristic described in connection with the implementations is included in at least one implementation, and the appearances of these phrases in various places in the specification are not necessarily all referring to the same implementation. Additionally, in the description, numerous specific details are set forth in order to provide a thorough disclosure. However, it will be apparent to one of ordinary skill in the art that these specific details may not all be needed in all implementations. In other circumstances, well-known structures, materials, circuits, processes and interfaces have not been described in detail, and/or illustrated in block diagram form, so as to not unnecessarily obscure the disclosure.

CONCLUSION

From the foregoing, it may be seen that implementations herein provide audio augmentation techniques that improve a user's experience during a video conference. In some implementations, audio to and from particular participants is augmented based upon a determination that the listening party is interested in a conversation between the particular participants. For example, the eyes of the user are tracked using gaze tracking technology. By determining where the user's eyes are focused, a party of interest to the user can be determined and the audio from that particular party can be augmented so that the user is able to hear what the particular party is talking about. Further, conversation groups can be determined based upon interest tracking information received from the other participants, so that audio to and from the members of a conversation group is augmented for the other members of the conversation group, but not for the video conference participants that are members of a different conversation group.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims Additionally, those of ordinary skill in the art appreciate that any arrangement that is calculated to achieve the same purpose may be substituted for the specific implementations disclosed. This disclosure is intended to cover any and all adaptations or variations of the disclosed implementations, and it is to be understood that the terms used in the following claims should not be construed to limit this patent to the specific implementations disclosed in the specification. Instead, the scope of this patent is to be determined entirely by the following claims, along with the full range of equivalents to which such claims are entitled.

The invention claimed is:

1. Computer readable storage media having computer readable program code embodied therein, the computer-readable program code adapted to be executed to implement a method comprising:
   connecting a computing device of a user to a plurality of participants participating in a video conference;
   displaying video images of the plurality of participants on a graphic user interface on a display of the computing device of the user;
   receiving user interest information determined by tracking a gaze of the user viewing the display to determine a video image of a particular participant of the plurality of participants that eyes of the user are focused on;
   receiving participant interest information from the plurality of participants indicating which participants each of the plurality of participants are looking at;
   determining from the user interest information and the participant interest information a subset of one or more participants of the plurality of participants for inclusion in a conversation group with the user, the conversation group comprising the subset of participants determined to be participating in or listening to a particular conversation of multiple conversations;
   displaying a panoramic view of a table including the interest information and personal information for each of the plurality of participants on the display of the computing device of the user; and
   increasing audio gain for audio received from the subset of participants included in the conversation group with the user for providing the audio with increased audio gain to the user.

2. The computer readable storage media according to claim 1, wherein the increasing the audio gain is carried by the computing device of the user.

3. The computer readable storage media according to claim 1, wherein the increasing the audio gain is carried out on a management computing device managing communication for the video conference prior to sending the audio with increased audio gain to the computing device of the user.

4. A method implemented by a user computing device having one or more processors executing instructions stored in computer-readable media, the method comprising:
   displaying video images of a plurality of participants on a graphic user interface on a display, wherein the plurality of participants are displayed in a panorama view of the plurality of participants present at an actual conference table in an environment having multiple microphones present for the plurality of participants;
   determining, for a first participant to a video conference, one or more second participants to a conversation of interest to the first participant from among the plurality of participants to the video conference by tracking a gaze of the first participant viewing the display to determine that eyes of the first participant are focused on a video image corresponding to one of the one or more second participants to a conversation of primary interest; and
   augmenting audio received by the first participant from the one or more second participants to the conversation of interest to the first participant to increase audibility of the audio received from the one or more second participants relative to audio received from the other participants of the plurality of participants of the video conference by increasing a gain on one or more microphones closest to the one or more second participants out of the multiple microphones.

5. The method according to claim 4, further comprising:
equalizing the amplitude of audio received by the first participant from the plurality of participants of the video conference.

6. The method according to claim 4, wherein determining the one or more second participants to the conversation of interest to the first participant further comprises:
displaying video images of the plurality of participants participating in the video conference on the graphic user interface on the display of the user computing device; and
determining the one or more second participants to the conversation of interest from among the plurality of participants includes receiving a manual indication from the first participant using a pointing device on the graphic user interface of the user computing device indicating a selection of one of the one or more second participants.

7. The method according to claim 4, further comprising:
determining a particular video image displayed on the graphic user interface as being a focus of the gaze of the first participant for a predetermined length of time;
identifying a particular participant corresponding to the particular video image as being one of the one or more second participants to the conversation of interest to the first participant; and
providing a visual indication on the graphic user interface to the first participant that the particular participant corresponding to the particular video image has been identified as corresponding to one of the one or more second participants from which augmented audio is to be received.

8. The method according to claim 4, further comprising a management computing device that receives video and audio communications from each of the participants to the video conference for distribution to the other participants of the video conference, wherein the determining for the first participant to a video conference, one or more second participants to the conversation of interest to the first participant from among the plurality of participants to the video conference further comprises:
receiving interest information from each of the participants to the video conference at the management computing device, the interest information indicating one or more participants each of the participants is interested in receiving augmented audio from;
determining from the received interest information the one or more second participants to the conversation of interest to the first participant; and
enhancing the audio from the one or more second participants prior to transmitting the audio to the first participant.

9. The method according to claim 8, wherein the audio from the one or more second participants is enhanced by increasing a gain of the audio from the one or more second participants by a predetermined amount over a gain of audio received from the other participants prior to mixing the audio from the one or more second participants and the audio from the other participants in a mixer at the management computing device.

10. The method according to claim 8, further comprising:
determining from the received interest information a conversation from among multiple ongoing conversations that each of the plurality of participants is interested in; and
enhancing audio sent to each of the plurality of participants to the video conference based upon the received interest information by grouping each of the participants into one of a plurality of conversation groups based upon the interest information, wherein audio to and from members of a particular conversation group is augmented for other members of the particular conversation group, but not augmented for participants that are members of a different conversation group.

11. The method according to claim 4,
wherein a particular second participant is identified as being included in the conversation of interest to the first participant following a determination that the first participant is looking at the particular second participant, and
wherein another second participant is determined to be included in the conversation of interest to the first participant following a determination that the particular second participant is looking at the other second participant, or the other second participant is looking at the particular second participant.

12. The method according to claim 4, further comprising:
receiving an audio input from the first participant; and
augmenting the audio input from the first participant to the one or more second participants to the conversation of interest to the first participant to increase the audibility of the audio input from the first participant to the one or more second participants relative to audio received from the other participants of the plurality of participants of the video conference.

13. The method according to claim 4, wherein the augmenting the audio received by the first participant from the one or more second participants to the conversation of interest to the first participant to increase the audibility of the audio is accomplished at least in part by increasing a gain of the audio received from the one or more second participants by a predetermined amount over gain of audio received from the other participants of the video conference.

14. Computer readable storage media having computer readable program code embodied therein, the computer-readable program code adapted to be executed by one or more processors to implement the method of claim 4.

15. A computing device comprising:
a communication interface;
a display; and
one or more processors coupled to computer readable storage media storing instructions adapted to be executed by the one or more processors for configuring the computing device to:
connect, via the communication interface, to a plurality of participants for participating in a video conference;
display video images of the plurality of participants on a graphic user interface on the display;
receive user interest information identifying a particular participant as being of interest;
distinguish and highlight the particular participant of interest on the display; and
in response to the particular participant remaining of interest for more than a predetermined threshold period of time, augmenting audio received from the particular participant identified as being of interest.

16. The computing device according to claim 15, wherein the computing device is further configured to:
receive participant interest information from the plurality of participants;
group each of the participants into one of a plurality of conversation groups based upon the participant interest information and the user interest information, wherein audio to and from members of a particular conversation group of which a user of the computing device is a member is augmented for other members of the particular conversation group, but not augmented for participants that are members of a different conversation group.

17. The computing device according to claim 15, wherein the computing device is further configured to determine user interest information by tracking a gaze of a user of the computing device using one or more gaze tracking sensors.

18. The computing device according to claim 15, wherein the computing device is further configured to determine user interest information by receiving an input from a pointing device on the graphic user interface.

19. The computing device according to claim 15, wherein the computing device is further configured to augment the audio received from the particular participant by increasing a gain of the audio received from the particular participant by a predetermined amount over gain of audio received from the other participants of the video conference.

* * * * *